United States Patent
Tsujimoto

(10) Patent No.: US 9,407,301 B2
(45) Date of Patent: Aug. 2, 2016

(54) ANGLE DIVERSITY RECEIVING DEVICE AND ANGLE DIVERSITY RECEIVING METHOD

(71) Applicant: NEC Corporation, Tokyo (JP)

(72) Inventor: Ichiro Tsujimoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/389,094

(22) PCT Filed: Mar. 22, 2013

(86) PCT No.: PCT/JP2013/001941
§ 371 (c)(1),
(2) Date: Sep. 29, 2014

(87) PCT Pub. No.: WO2013/145663
PCT Pub. Date: Oct. 3, 2013

(65) Prior Publication Data
US 2015/0072634 A1    Mar. 12, 2015

(30) Foreign Application Priority Data

Mar. 29, 2012 (JP) ................................ 2012-076489

(51) Int. Cl.
*H04B 7/14* (2006.01)
*H04B 1/10* (2006.01)
(Continued)

(52) U.S. Cl.
CPC ........... *H04B 1/1081* (2013.01); *H01Q 3/2605* (2013.01); *H01Q 25/00* (2013.01); *H04B 7/0865* (2013.01); *H04B 7/0885* (2013.01)

(58) Field of Classification Search
CPC ..... H01Q 1/246; H01Q 25/00; H01Q 25/005; H04B 7/0408; H04B 7/0695; H04B 7/10; H04W 88/08; H04W 16/28

USPC ............ 455/25, 278.1, 63.4, 562.1; 342/375, 342/378, 380, 383
See application file for complete search history.

(56) References Cited

U.S. PATENT DOCUMENTS

| 5,379,046 A | 1/1995 | Tsujimoto |
| 5,425,059 A | 6/1995 | Tsujimoto |

(Continued)

FOREIGN PATENT DOCUMENTS

| EP | 0687076 | 12/1995 |
| EP | 1843485 | 10/2007 |

(Continued)

OTHER PUBLICATIONS

International Search Report, PCT/JP2013/001941, Jun. 18, 2013.
(Continued)

*Primary Examiner* — Sonny Trinh
(74) *Attorney, Agent, or Firm* — Young & Thompson

(57) ABSTRACT

An angle diversity receiving device performs angle diversity reception by configuring branches of angle diversity in accordance with received signals of an array antenna, the angle diversity receiving device being provided with:
a plurality of phased array synthesizing unit that generates a received signal of a branch by performing phased array synthesis for the received signals of a plurality of antenna elements included in the array antenna; and
a correlation control unit that outputs a correlation value for the received signals of two branches;
wherein the phased array synthesizing unit controls the angular difference in the orientations of the branches for which the correlation value was computed so that the correlation value decreases.

6 Claims, 9 Drawing Sheets

(51) Int. Cl.
  *H04B 7/08* (2006.01)
  *H01Q 3/26* (2006.01)
  *H01Q 25/00* (2006.01)

(56) References Cited

U.S. PATENT DOCUMENTS

| | | | |
|---|---|---|---|
| 5,608,409 A * | 3/1997 | Rilling | H01Q 3/2605 342/375 |
| 5,752,173 A | 5/1998 | Tsujimoto | |
| 5,929,811 A * | 7/1999 | Rilling | H01Q 3/2605 342/375 |
| 6,006,072 A * | 12/1999 | Tsujimoto | H04B 7/10 455/63.1 |
| 7,623,084 B2 | 11/2009 | Hoferer | |
| 8,369,436 B2 | 2/2013 | Stirling-Gallacher | |
| 8,611,455 B2 | 12/2013 | Stirling-Gallacher | |
| 2005/0147064 A1 | 7/2005 | Nakagawa | |
| 2007/0243831 A1* | 10/2007 | Seki | H04B 7/0408 455/69 |
| 2008/0062056 A1 | 3/2008 | Hoferer | |

FOREIGN PATENT DOCUMENTS

| | | |
|---|---|---|
| JP | 04-227132 | 8/1992 |
| JP | 05-344029 | 12/1993 |
| JP | 06-029890 | 2/1994 |
| JP | 07-050868 | 5/1995 |
| JP | 2982504 | 9/1999 |
| JP | 2003-338804 | 11/2003 |
| WO | WO 2006/070478 | 7/2006 |

OTHER PUBLICATIONS

P. Monsen, "Performance of an Experimental Angle-Diversity Troposcatter System", IEEE Transaction on Communications, Apr. 1972, p. 242-247.

Extended European Search Report dated Nov. 17, 2015; Application No. 13768203.5.

* cited by examiner

ANGLE DIVERSITY RECEIVING DEVICE AND ANGLE DIVERSITY RECEIVING METHOD

TECHNICAL FIELD

The invention relates to an angle diversity receiving device and an angle diversity receiving method.

BACKGROUND ART

FIG. 7 is a block diagram illustrating a configuration of an angle diversity receiving device 600 related to the invention. Referring to FIG. 7, the angle diversity receiving device 600 includes a group of antennas 611 composed of two horn antennas 61A and 61B. The angle diversity receiving device 600 receives a received signal from the horn antenna 61A through a band pass filter (BPF) 221, a low noise amplifier (LNA) 231, a received frequency converter (down converter, D/C) 241, an automatic gain controller (AGC) 251, and an adaptive matched filter (AMF) 131.

Further, the angle diversity receiving device 600 receives a received signal from the horn antenna 61B through a band pass filter 222, a low noise amplifier 232, a received frequency converter 242, an automatic gain controller 252, and an adaptive matched filter 132. In this way, the angle diversity receiving device 600 receives the received signals from the horn antennas 61A and 61B, as two branches (receiving system) in which angle diversity is performed.

The band pass filters (BPF) 221 and 222 allow only signals within a frequency band required for reception to pass. The low noise amplifiers (LNA) 231 and 232 amplify the received signals. The received frequency converters (down converter, D/C) 241 and 242 frequency-convert the received signals. The automatic gain controllers (AGC) 251 and 252 amplify the received signals so as to suppress amplitude change of the received signals outputted to following steps. The adaptive matched filters 131 and 132 decrease unnecessary signals included in the received signal of each branch.

Incidentally, diversity synthesizing circuit 140 performs diversity combining of signals inputted from the adaptive matched filters 131 and 132. An automatic equalization circuit (decision feedback equalizer, DFE) 150 performs automatic equalization on the signals performed the diversity combining and reproduces the received signals.

Such kinds of angle diversity receiving devices are disclosed for example in PTLs (Patent Literatures) 1 to 6 and NPL (Non Patent Literature) 1, except than above described one.

FIG. 8 is a diagram explaining tropospheric scatter propagation. A receiving antenna 812 corresponds to, for example, the group of antennas 611 of the angle diversity receiving device 600 shown in FIG. 7. A radio wave transmitted from a transmitting station 811 is scattered at a first scattering point STa and a second scattering point STb, and received, as signals of orientations DTa and DTb, by the group of antennas 812.

FIG. 9 is a diagram explaining operations of the angle diversity receiving device 600 based on a related technology. The angle diversity receiving device 600 shown in FIG. 7 and FIG. 9 operates as follows. As shown in FIG. 9, two beams of antenna DR6a and DR6b are fixed at predetermined angles. Then, the group of antennas 611 performs angle diversity processing on received signals arriving from the dual beams of DR6a and DR6b.

The angle diversity receiving device 600 receives an arriving radio wave in a transmitting direction DTa of FIG. 8 based on the beam of DR6a in FIG. 9, and receives an arriving radio wave in a transmitting direction DTb of FIG. 8 based on the beam of DR6b. Here, if a condition of tropospheric scatter changes and a spatial position of the scattering points STa or STb changes, the transmitting direction DTa or the transmitting direction DTb changes. As a result, intensity of the received signals in the angle diversity receiving device 600 may remarkably decrease.

That is, in the angle diversity system in which a direction of the horn antenna is fixed, when an azimuth of an arriving radio wave changes as a result of propagation condition changes, a reception level may be reduced. Particularly, in tropospheric scatter propagation, a condition of scatter propagation in troposphere widely changes due to climate change. Consequently, in the angle diversity system in which the orientations of the antennas are fixed, long-period fading with propagation loss of 10 dB to 20-odd dB occurs throughout one year, and a reception level of the radio wave may decrease.

Additionally, in the angle diversity receiving device, an angle between a plurality of receiving horns is preliminarily arranged so that a correlation value between branches does not increase. In the angle diversity receiving device, a correlation value between the branches may increase as a condition of troposphere scatter changes and a diversity effect may decrease.

CITATION LIST

Patent Literature

[PTL 1] Japanese Patent Publication No. 2982504
[PTL 2] U.S. Pat. No. 7,623,084 B2
[PTL 3] Japanese unexamined patent publication No. 06-029890
[PTL 4] Japanese unexamined patent publication No. 05-344029
[PTL 5] Japanese unexamined patent publication No. 04-227132
[PTL 6] Japanese examined patent publication No. 07-050868

Non Patent Literature

[NPL 1] 'Performance of an Experimental Angle-Diversity Troposcatter System' (P. Monsen, IEEE TRANSACTIONS ON COMMUNICATIONS, April 1972, P242-247)

SUMMARY OF INVENTION

Technical Problem

As described above, the angle diversity receiving device is required to be able to avoid decrease of the reception level even though an arriving angle of a radio wave changes, and to maintain the diversity effect even though a condition of tropospheric scatter propagation changes.

An object of the invention is to provide an angle diversity receiving device and an angle diversity receiving method which can avoid decrease of the reception level even though an arriving angle of a radio wave changes, and to maintain the diversity effect even though a condition of tropospheric scatter propagation changes.

Solution to Problem

The angle diversity receiving device of the invention is an angle diversity receiving device which performs angle diversity reception by configuring branches of an angle diversity in accordance with received signals of an array antenna and the angle diversity receiving device includes a plurality of phased array synthesizing means for generating a received signal of the branch by performing phased array synthesis for the received signals of a plurality of antenna elements included in the array antenna and correlation control means for outputting a correlation value between two received signals of the branches, and the phased array synthesizing means controls an angular difference in orientations of the branches for which the correlation value is calculated so that the correlation value decreases.

The angle diversity receiving method of the invention is an angle diversity receiving method in which angle diversity reception is performed by configuring branches of diversity in accordance with received signals of an array antenna, and the method includes generating a received signal of a branch by performing phased array synthesis for the received signals of a plurality of antenna elements included in the array antenna, outputting a correlation value for two received signals of the branches and controlling an angular difference in orientations between the branches for which the correlation value is calculated so that the correlation value decreases.

Advantageous Effect of Invention

The angle diversity receiving device and the angle diversity receiving method of the invention can avoid decrease of a reception level even though an arriving angle of a radio wave changes, and can maintain a diversity effect even though a condition of tropospheric scatter propagation changes.

DESCRIPTION OF EMBODIMENTS

[First Exemplary Embodiment]

Figure 1:
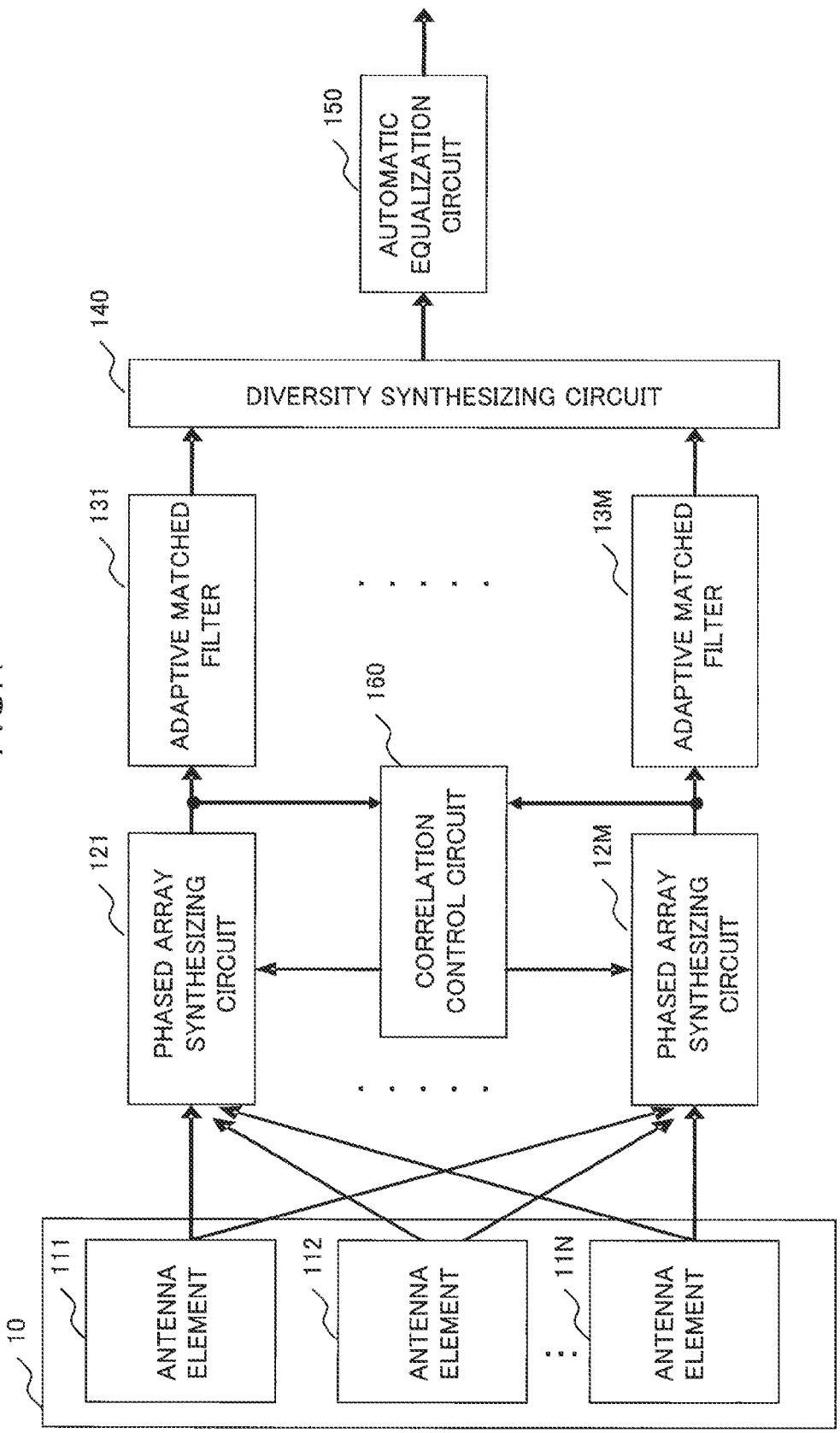
FIG. 1 is a brief block diagram illustrating a configuration of an angle diversity receiving device of a first exemplary embodiment of the invention.

FIG. 1 is a brief block diagram illustrating a configuration of an angle diversity receiving device 100 of a first exemplary embodiment of the invention. In FIG. 1, the angle diversity receiving device 100 of the first exemplary embodiment includes an array antenna 10, M phased array synthesizing circuits 121 to 12M, M adaptive matched filters 131 to 13M, a diversity synthesizing circuit 140, an automatic equalization circuit 150, and a correlation control circuit 160. The array antenna 10 includes N antenna elements 111 to 11N. Here, each of M and N is an integer which is two or more than two, and M is equal to N or less than N.

Received signals from the antenna elements 111 to 11N are inputted to the phased array synthesizing circuits 121 to 12M. Each of the phased array synthesizing circuits 121 to 12M selects two or more than two received signals from the received signals received from the antenna elements 111 to 11N and performs phased array synthesis. The phased array synthesizing circuits 121 to 12M form M branches. Then, outputs of the phased array synthesizing circuits 121 to 12M are inputted into M adaptive matched filters 131 to 13M, respectively, and synthesized by diversity synthesizing circuit 140. In this way, the angle diversity synthesis is performed to M branches. An output of the diversity synthesizing circuit 140 is automatically equalized by the automatic equalization circuit 150 and consequently a received data signal is acquired.

The angle diversity receiving device 100 controls orientations of the branches as an arrive direction of a radio wave changes, by using the phased array synthesizing circuits 121 to 12M connecting to the plurality of antenna elements. The angle diversity receiving device 100 forms a plurality of sub-arrays from among the plurality of branches, and utilizes outputs of the sub-arrays as the received signals of the branches of the angle diversity. The angle diversity receiving device 100 performs adaptive matched filtering between the branches of the angle diversity, performs maximal ratio synthesizing including time-dispersed multi paths, and performs optimal angle diversity reception.

In the first exemplary embodiment, the correlation control circuit 160 calculates a correlation value between two outputs selected from outputs of the phased array synthesizing circuits 121 to 12M. The calculated correlation value is inputted into the phased array synthesizing circuit which outputs the two selected signals. The correlation control circuit 160 may sequentially calculate a correlation value between two outputs in M outputs of the phased array synthesizing circuits 121 to 12M.

Figure 2:
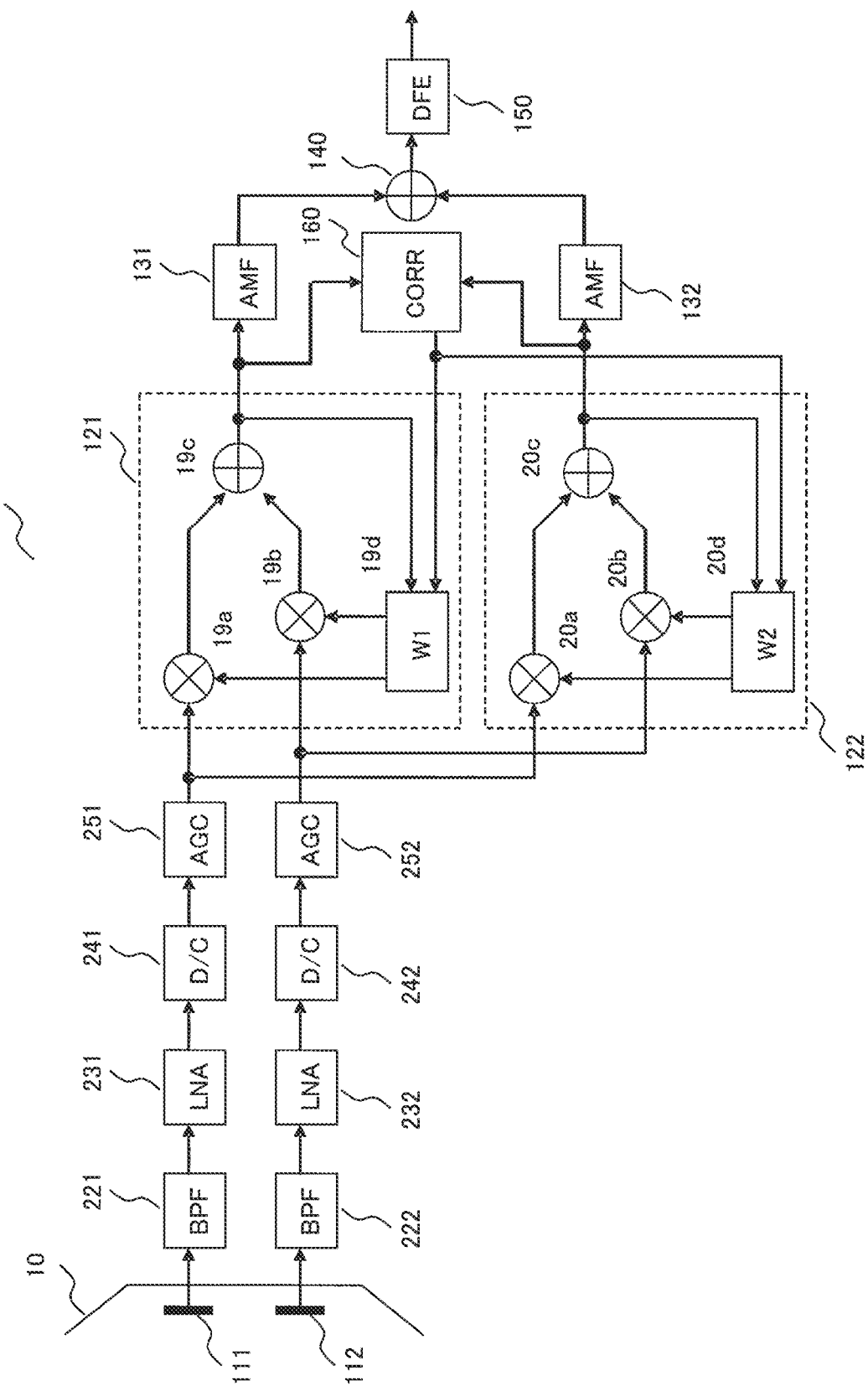
FIG. 2 is a brief block diagram illustrating a form of a specific configuration of the angle diversity receiving device illustrated in FIG. 1.

FIG. 2 is a block diagram illustrating a form of a specific configuration of the angle diversity receiving device 100 illustrated in FIG. 1.

An angle diversity receiving device 100a includes the array antenna 10, the phased array synthesizing circuits 121 and 122, adaptive matched filters (AMF) 131 AND 132, the diversity synthesizing circuit 140, the correlation control circuit (CORR) 160, and the automatic equalization circuit (decision feedback equalizer, DFE) 150. The array antenna 10 includes antenna elements 11a and 11b.

Further, the angle diversity receiving device 100a includes, between the array antenna 10 and the phased array synthesizing circuits 121 and 122, the band pass filters (BPF) 221 and 222, the low noise amplifiers (LNA) 231 and 232, the received frequency converters (down converter, D/C) 241 and 242, and the automatic gain controllers (AGC) 251 and 252.

Figure 7:
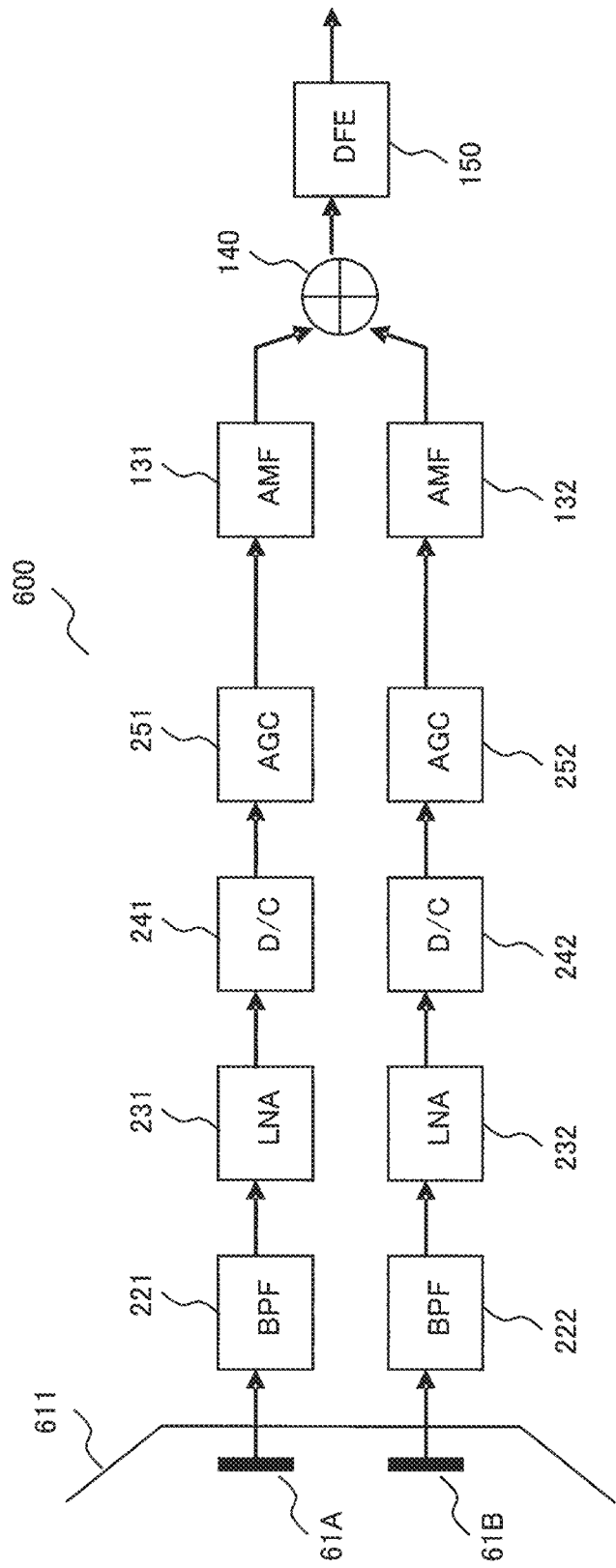
FIG. 7 is a block diagram illustrating a configuration of an angle diversity receiving device related to the invention.

Functions of the band pass filters 221 and 222, the low noise amplifiers 231 and 232, the received frequency converters 241 and 242, and the automatic gain controllers 251 and 252 are similar to those of the blocks having the same name shown in FIG. 7.

In FIG. 2, the number of the diversity branches is two. Further, the array antenna 10 includes the antenna elements 111 and 112. Incidentally, each of the antenna elements 111 and 112 may be a horn antenna with an antenna reflector.

The angle diversity receiving device 100a performs linear synthesis of received signals received by the antenna elements 111 and 112, in the phased array synthesizing circuits 121 and 122. Thereby the angle diversity receiving device 100a controls the phased array.

The correlation control circuit 160 calculates correlation between an output signal of the phased array synthesizing circuit 121 and an output signal of the phased array synthesizing circuit 122 and outputs the calculated correlation to the phased array synthesizing circuits 121 and 122.

Here, a complex coefficient by which each sub-array is multiplied in the phased array synthesizing circuit 121 is represented as W1, and a complex coefficient by which each sub-array is multiplied in the phased array synthesizing circuit 122 is represented as W2.

W1 is multiplied by a signal of each sub-array in a complex multiplier 19a or a complex multiplier 19b. Outputs of the complex multipliers 19a and 19b are added in an adder 19c and the sum of the outputs of the complex multipliers 19a and 19b is outputted from the phased array synthesizing circuit 121. W2 is multiplied by a signal of each sub-array in a complex multiplier 20a or a complex multiplier 20b. Outputs of the complex multipliers 20a and 20b are added in an adder 20c and the sum of the outputs of the complex multipliers 20a and 20b is outputted from the phased array synthesizing circuit 122.

The complex coefficient W1 is adjusted on the basis of the output of the phased array synthesizing circuit 121 and the correlation value inputted from the correlation control circuit 160 so that the output of the phased array synthesizing circuit 121 is maximized.

Further, the complex coefficient W2 is adjusted on the basis of the output of the phased array synthesizing circuit 122 and the correlation value inputted from the correlation control circuit 160 so that the output of the phased array synthesizing circuit 122 is maximized.

Specifically, weighting coefficients W1 and W2 are calculated in accordance with following adaptive algorithm.

$$W1(n+1)=W1(n)+(1-\mu)[r1^*(n) \cdot y1(n)] \quad \text{(Equation 1)}$$

$$W2(n+1)=W2(n)+(1-\mu)[r2^*(n) \cdot y2(n)] \quad \text{(Equation 2),}$$

where r1 and r2 are input signal vectors of the phased array synthesizing circuits 121 and 122, respectively (two-dimensional vectors in FIG. 2), y1 and y2 are output signal vectors of the phased array synthesizing circuits 121 and 122, respectively, a symbol * represents complex conjugate, n in the parenthesis represents a nth sample, μ represents an adjustment coefficient. In Equation 1 and Equation 2, since the algorithm is positive feedback type, (1-μ) is multiplied in order to avoid divergence of the calculation result and sequentially multiply by a multiplier for adaptively converging.

Figure 3:
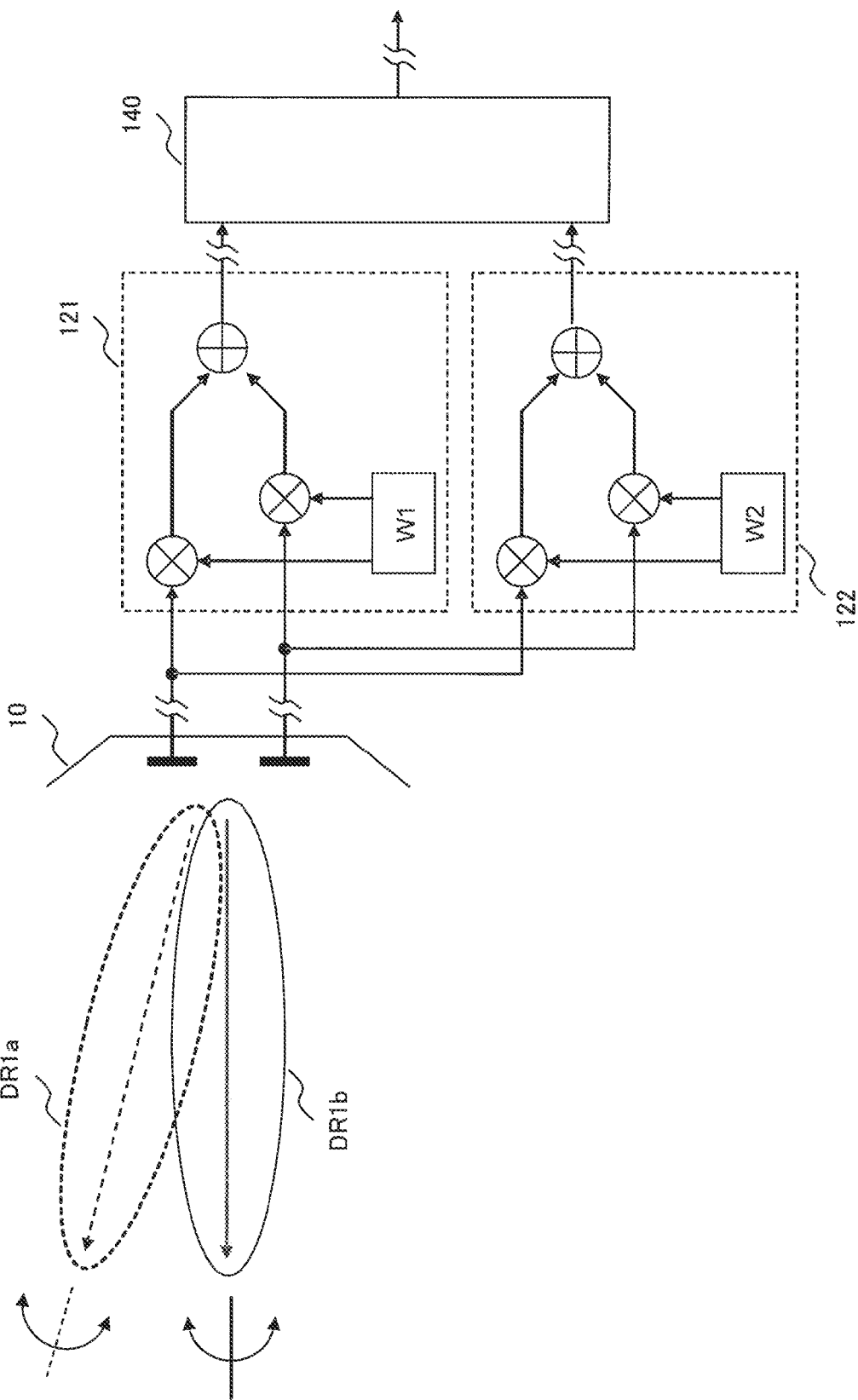
FIG. 3 is a block diagram explaining an operation of the angle diversity receiving device.

According to the algorithm described above, the phased array synthesizing circuits 121 and 122 separately control the orientation of the diversity branch to maximize a reception level. Explanatory drawing of the operations are shown in FIG. 3. DR1a is a beam of an antenna of a first diversity branch of the phased array synthesizing circuit 121. DR1b is a beam of the antenna of a second diversity branch of the phased array synthesizing circuit 122. An angle of each orientation is variable.

A case is explained, in which the angle diversity receiving devices 100 and 100a of the first exemplary embodiment are applied to tropospheric scatter propagation.

Figure 8:
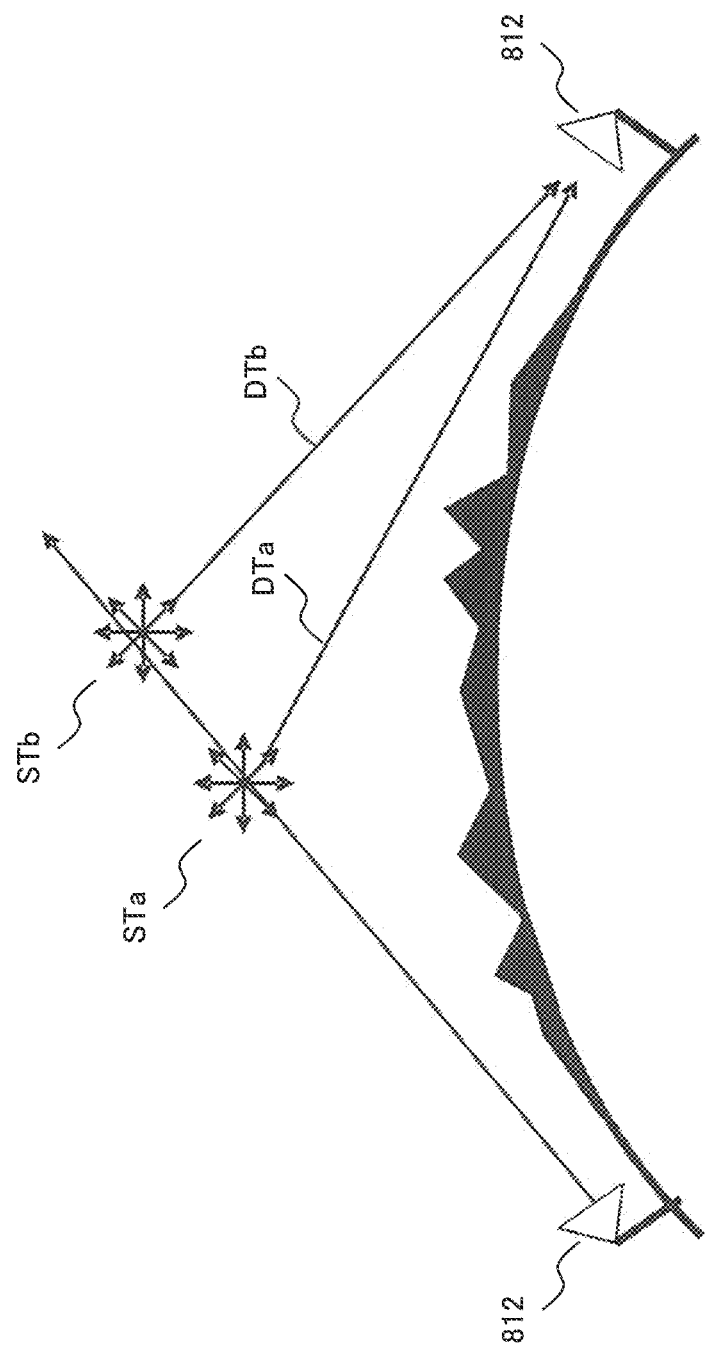
FIG. 8 is a block diagram explaining tropospheric scatter propagation.
Figure 9:
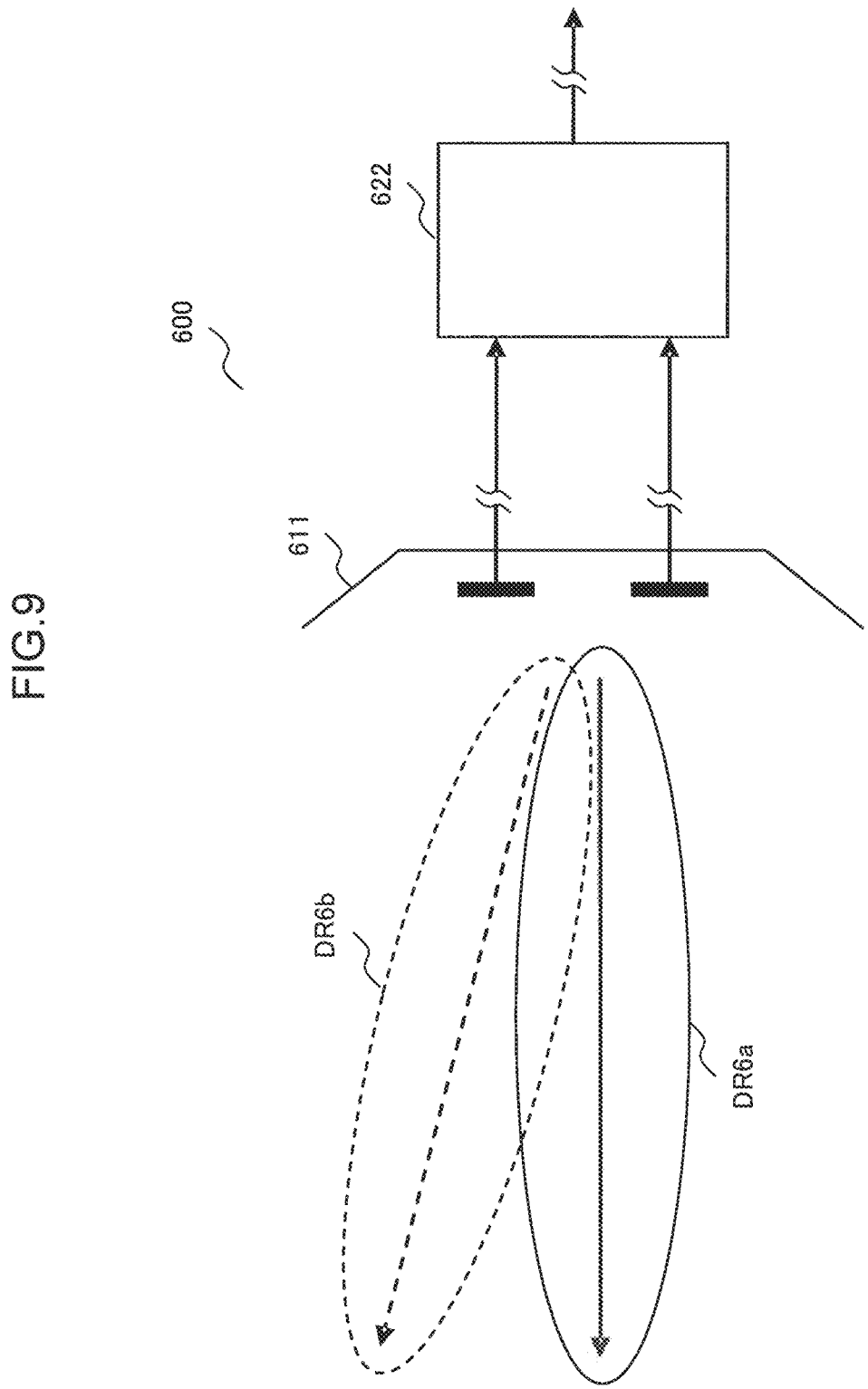
FIG. 9 is a block diagram explaining an operation of the angle diversity receiving device of a related technology.

Tropospheric scatter propagation is explained again by using FIG. 8. An array antenna of a receiving station (angle diversity receiving devices 100 and 100a) corresponds to the receiving antenna 812. A transmission beam transmitted from the transmitting station 811 is scattered in the troposphere. The scattering region is called a scattering volume and includes spatial extent. A signal from the first scattering point STa in the orientation DTa and a signal from the second scattering point STb in the orientation DTb arrive at the receiving antenna 812 of the over-the-horizon receiving station (angle diversity receiving devices 100 and 100a).

Here, the scattering points STa and STb are spatially separated and each scattering phenomenon randomly changes. The scattering phenomena at the scattering points STa and STb are therefore uncorrelated one another. A received signals between the orientations DTa and DTb are an uncorrelated fading signal one another.

Therefore, if a plurality of receiving elements having an angular difference therebetween (e.g. DR1a, DR1b in FIG. 3) receive a signal in the orientation DTa and a signal in the orientation DTb, it is possible to synthesize branches of diversity which are uncorrelated one another and to perform angle diversity.

Incidentally, in actual scatter propagation, when the scattering points STa and STb are spatially closed to each other, signals from the scattering points are not perfectly uncorrelated and include some degree of correlation. Patent Literature 2 describes if a correlation value between branches of angle diversity is equal to or less than 0.6, the angle diversity is effective.

If spatial distance between the scattering points STa and STb increases, the correlation value decreases and an angle between the orientations DTa and DTb increases. In the invention, the beams of DR1a and DR1b which increase an angle between the branches of the angle diversity are arranged by controlling an orientation of the phased array, and the correlation value is decreased to maintain the diversity effect.

Figure 4:
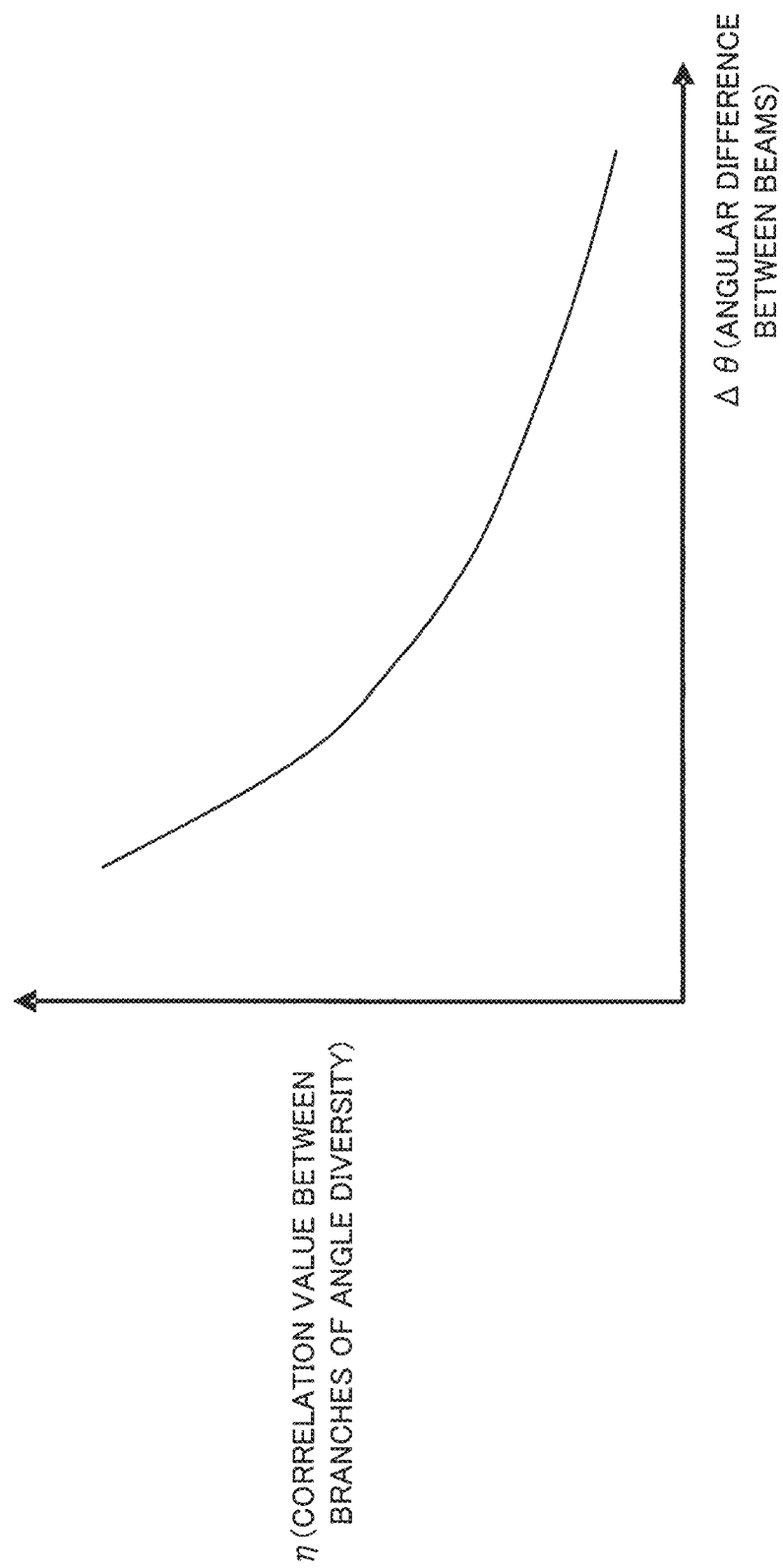
FIG. 4 is a block diagram illustrating a relationship between a correlation value between branches of the angle diversity and distance of orientations (angular difference between beams).

FIG. 4 is a block diagram illustrating a relationship between a correlation value between the branches of the angle diversity and a distance of orientations (angular difference between beams). In FIG. 4, a vertical axis represents a correlation value η between the branches of the angle diversity and a horizontal axis represents an angular difference Δθ between beams of the branches. As shown in FIG. 4, the correlation value η between the branches of the angle diversity decreases as the angular difference between beams of the branches Δθ increases.

The orientation vectors (directionality) G1 and G2 of DR1a and DR1b shown in FIG. 3 are defined as follows.

$$G1=g1 \cdot \exp(j\theta 1) \quad \text{(Equation 3)}$$

$$G2=g2 \cdot \exp(j\theta 2) \quad \text{(Equation 4)}$$

in the above equations 3, 4, g1 is an amplitude of an directional vector in the beam of DR1a, θ1 is an angle of elevation of the directional vector, g2 is an amplitude of an directional vector in the beam of DR1b, and θ2 is an angle of elevation of the directional vector.

The vectors G1 and G2 are directional vectors which the branches show when outputs of the phased array synthesizing circuits 121 and 122 are maximized. When the scattering points STa and STb shown in FIG. 8 come close to each other, the directionality G1 and the directionality G2 may come close one another according to circumstances. In this case, the correlation value between the branches increases and the diversity effect is decreased. In the invention, the correlation value between the branches is calculated and the vector G1 is multiplied by exp(+jΔθ/2) so that the correlation value decreases, i.e. the angular difference Δθ is increased, on the basis of the relationship shown in shown in FIG. 4. The vector G2 is multiplied by $\exp(-j\Delta\theta/2)$. With respect to G1 and G2, perturbation correction on $\Delta\theta$ is performed as follows.

$$G1 = g1 \cdot \exp(j\theta 1) \cdot \exp(+j\Delta\theta/2) \quad \text{(Equation 5)}$$

$$G2 = g2 \cdot \exp(j\theta 2) \cdot \exp(-j\Delta\theta/2) \quad \text{(Equation 6)}$$

When the perturbation correction on the orientation vectors G1 and G2 is performed, the angle diversity effect can be maintained while keeping correlation between the angle diversity low.

As the result, the angle diversity receiving device of the first exemplary embodiment can avoid decrease of the reception level even though a radio wave arriving angle changes, and can maintain the diversity effect even though a condition of tropospheric scatter propagation changes.

Additionally, the angle diversity receiving device 100 illustrated in FIG. 1 can be configured also as follows.

The angle diversity receiving device 100 is an angle diversity receiving device which performs angle diversity reception by configuring branches of the angle diversity using received signals of an array antenna. Then, the angle diversity receiving device 100 includes the array antenna, phased array synthesizing circuits 20-1 to 20-N, and the correlation control circuit 160.

The phased array synthesizing circuits 201 to 20N perform phased array synthesis of received signals of a plurality of antenna elements included in the antenna array to generate received signals of the branches. The correlation control means outputs a correlation value between the received signals of the branches. The phased array synthesizing circuits 201 to 20N control an angular difference of orientations between the branches so that the correlation value outputted from the correlation control means 160 decreases.

In such configuration, the angle diversity receiving device 100 can avoid decrease of the reception level even though the radio wave arriving angle changes, by performing phased array synthesis. Then, the angle diversity receiving device 100 can maintain the diversity effect even though a condition of tropospheric scatter propagation changes, by controlling an angular difference of orientations between the branches so that the correlation value between the branches decreases.

[Second Exemplary Embodiment]

Figure 5:
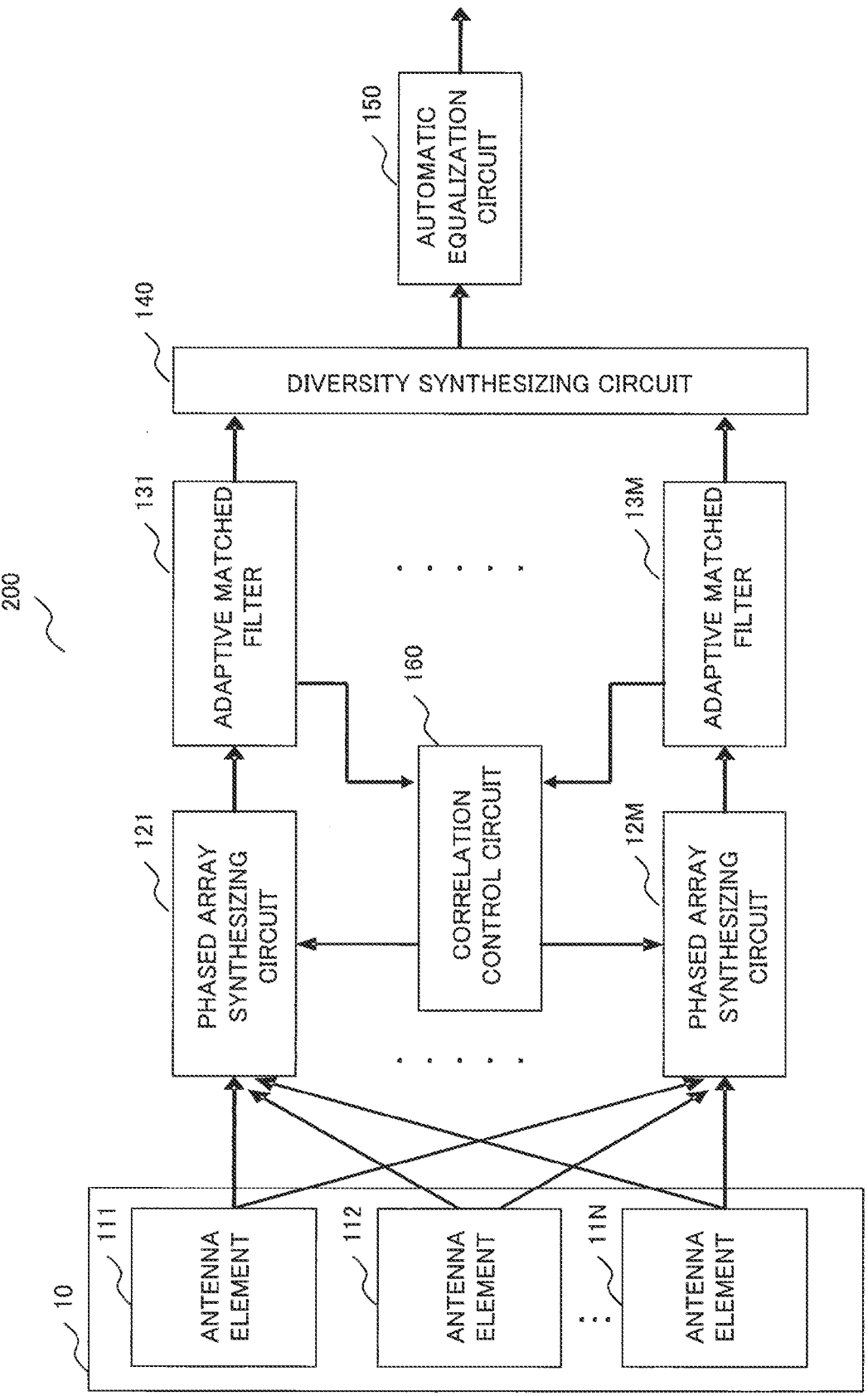
FIG. 5 is a brief block diagram illustrating a configuration of an angle diversity receiving device of a second exemplary embodiment of the invention.

FIG. 5 is a brief block diagram illustrating a configuration of an angle diversity receiving device 200 of a second exemplary embodiment of the invention. The angle diversity receiving device 200 differs from the first exemplary embodiment in that mutual correlation between outputs of a plurality of phased array synthesizing circuits is calculated by using a complex tap multiplication coefficient of an adaptive matched filter.

Namely, referring to FIG. 5, the complex tap multiplication coefficients of the adaptive matched filters 131 to 13M are inputted into the correlation control circuit 160, and the correlation control circuit 160 calculates a correlation value on the basis of complex tap multiplication coefficients of two adaptive matched filters selected from the adaptive matched filters 131 to 13M. Incidentally, a configuration and basic operations of the angle diversity receiving device 200 except an inputting part for the correlation control circuit 160 are similar to the angle diversity receiving device 100 illustrated in FIG. 1, and therefore detailed explanations thereof are omitted.

Figure 6:
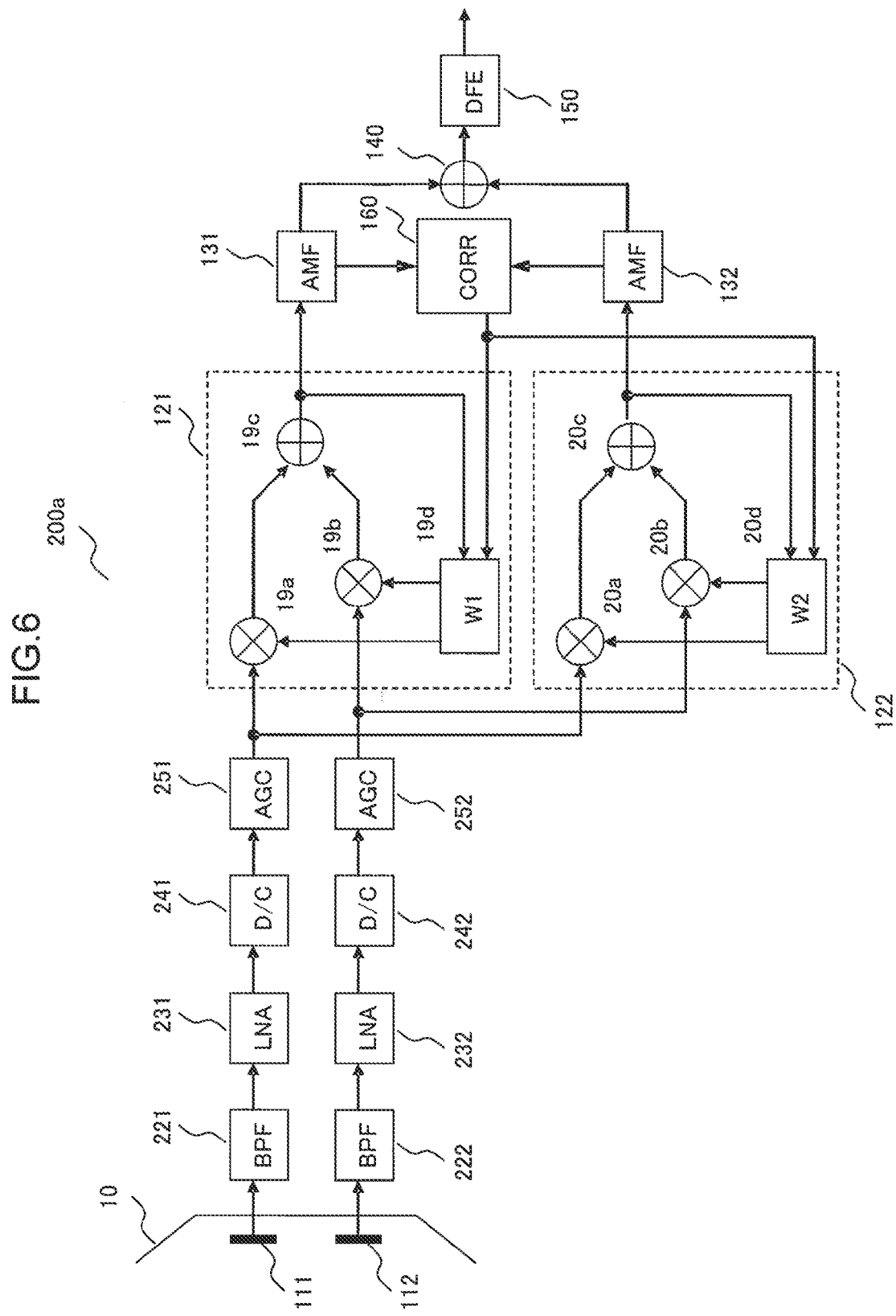
FIG. 6 is a block diagram illustrating an example of a specific configuration of the angle diversity receiving device illustrated in FIG. 5.

FIG. 6 is a block diagram illustrating an example of a specific configuration of the angle diversity receiving device 200 illustrated in FIG. 5. Referring to FIG. 6, an angle diversity receiving device 200a includes, just like the angle diversity receiving device 100a, the array antenna 10, the phased array synthesizing circuits 121 and 122, the adaptive matched filters (AMF) 131 and 132, the diversity synthesizing circuit 140, the correlation control circuit (CORR) 160, and the automatic equalization circuit (decision feedback equalizer, DFE) 150. The array antenna 10 includes antenna elements 11a and 11b.

The angle diversity receiving device 200a further includes, between the array antenna 10 and the phased array synthesizing circuits 121 and 122, the band pass filters (BPF) 221 and 222, the low noise amplifiers (LNA) 231 and 232, the received frequency converters (down converter, D/C) 241 and 242, and the automatic gain controllers (AGC) 251 and 252.

The band pass filters 221 and 222, the low noise amplifiers 231 and 232, the received frequency converters 241 and 242, and the automatic gain controllers 251 and 252 have the same functions as those of the blocks with the same name shown in FIG. 7.

That is, the number of diversity branches of the angle diversity receiving device 200a shown in FIG. 6 is two. Each of the antenna elements 111 and 112 may be the horn antenna having the antenna reflector.

The angle diversity receiving device 200a linearly synthesizes received signals of the antenna elements 111 and 112 with the phased array synthesizing circuits 121 and 122. Thereby control of a phased array is performed.

In the angle diversity receiving device 200a, mutual correlation between an output of the phased array synthesizing circuit 121 and an output of the phased array synthesizing circuit 122 is calculated by using the complex tap multiplication coefficients of the adaptive matched filters 131 and 132.

That is, correlation control circuit 160 calculates a correlation value between the complex tap multiplication coefficient of the adaptive matched filter 131 and the complex tap multiplication coefficient of the adaptive matched filter 132 and outputs the calculated correlation value to the phased array synthesizing circuits 121 and 122.

Here, a complex coefficient by which each sub-array is multiplied in the phased array synthesizing circuit 121 is represented as W1, and a complex coefficient by which each sub-array is multiplied in the second phased array synthesizing circuit 122 is represented as W2.

The complex coefficient W1 is adaptively-adjusted on the basis of the output of the phased array synthesizing circuit 121 and the correlation value inputted from the correlation control circuit 160, so that the output of the phased array synthesizing circuit 121 is maximized.

The complex coefficient W2 is adaptively-adjusted on the basis of the output of the phased array synthesizing circuit 122 and the correlation value inputted from the correlation control circuit 160, so that the output of the phased array synthesizing circuit 122 is maximized.

The values of W1 and W2 are calculated by Equation 1 and Equation 2, like the first exemplary embodiment. The orientation vectors (directionality) of angle diversity branches G1 and G2 are calculated by Equation (3) to Equation (6).

In this configuration, when outputs of the phased array synthesizing circuits 121 and 122 are maximized by using Equations (1) to (6) described in the first exemplary embodiment and when the perturbation correction on the orientation vectors G1 and G2 is performed, the angle diversity effect can be maintained while keeping correlation between the angle diversity low.

Consequently, the angle diversity receiving device of the second exemplary embodiment can avoid decrease of the reception level even though the radio wave arriving angle changes, and can maintain the diversity effect even though a condition of tropospheric scatter propagation changes, just like the angle diversity receiving device of the second exemplary embodiment.

[Third Exemplary Embodiment]

An angle diversity receiving device of a third exemplary embodiment of the invention includes a plurality of phased array synthesizing circuits for performing phased array synthesis of received signals of a plurality of antenna elements, as branches, by performing multiplication and addition of complex coefficients, a correlation control circuit for controlling an angular difference between orientations of branches so that a correlation value between the branches is minimized, on the basis of each output of the plurality of phased array synthesizing circuit, a plurality of adaptive matched filters to which outputs of the plurality of phased array synthesizing circuit are inputted, a diversity synthesizing circuit for performing angle diversity synthesis by synthesizing outputs of the plurality of adaptive matched filters, and an automatic equalization circuit for automatically equalizing an output of the diversity synthesizing circuit.

[Fourth Exemplary Embodiment]

An angle diversity receiving device of a fourth exemplary embodiment of the invention includes a plurality of phased array synthesizing circuits for performing phased array synthesis of received signals of a plurality of antenna elements, as branches, by performing multiplication and addition of complex coefficients, a plurality of adaptive matched filters to which outputs of the plurality of phased array synthesizing circuit are inputted, a diversity synthesizing circuit for performing angle diversity synthesis by synthesizing outputs of the plurality of adaptive matched filters, an automatic equalization circuit for automatically equalizing an output of the diversity synthesizing circuit, a correlation control circuit for controlling an angular difference between orientations of branches so that a correlation value between the branches is minimized on the basis of complex tap multiplication coefficients of the plurality of adaptive matched filters.

The plurality of antenna elements of the third and the fourth exemplary embodiments of the invention may be horn antennas.

Needless to say, the invention of the present application is not limited to the above mentioned embodiments and it is to be understood that to the configurations and details of the invention of the present application, various changes can be made within the scope of the invention of the present application.

This application claims priority from Japanese Patent Application No. 2012-076489 filed on Mar. 29, 2012, and the contents of which are incorporation herein by reference in their entirety.

INDUSTRIAL APPLICABILITY

For example, the angle diversity receiving devices of the first to the fourth exemplary embodiments are applicable to communication employing angle diversity in propagation in which multi path fading occurs. As usage examples, the invention is applicable to tropospheric scatter propagation communication or land mobile communication.

REFERENCE SIGNS LIST 10, 611 array antenna
111-11N, 61A, 61B antenna element
100, 100a, 200, 200a angle diversity receiving device
121-12M phased array synthesizing circuit
131-13M adaptive matched filter
140 diversity synthesizing circuit
150 automatic equalization circuit
160 correlation control circuit
19a, 19b, 20a, 20b complex multiplier
19c, 20c adder
160 correlation control circuit (CORR)
221, 222 band path filter (BPF)
231, 232 low noise amplifier (LNA)
241, 242 reception frequency converter (down converter, D/C)
251, 252 automatic gain controller (AGC)
811 transmitting station
812 receiving antenna

The invention claimed is:

1. An angle diversity receiving device performing angle diversity reception by configuring branches of angle diversity in accordance with received signals of an array antenna, the angle diversity receiving device comprising:
a plurality of phased array synthesizing unit that generates a received signal of the branch by performing phased array synthesis for received signals of a plurality of antenna elements included in the array antenna; and
a correlation control unit that calculates and outputs a correlation value between two received signals of the branches, wherein
the phased array synthesizing unit controls an angular difference in orientations of the branches for which the correlation value is calculated so that the correlation value decreases.

2. The angle diversity receiving device of claim 1, further comprising:
a plurality of adaptive matched filters that receives outputs of the phased array synthesizing unit;
a diversity synthesizing unit that performs angle diversity synthesis by synthesizing outputs of the adaptive matched filters; and
an automatic equalizing unit that automatically equalizes an output of the diversity synthesizing unit,
wherein the correlation control unit outputs the correlation value on the basis of two outputs of the phased array synthesizing units, and each of the phased array synthesizing unit performs phased array synthesis by multiplying the received signal of the branch by a complex coefficient based on the correlation value and adding up the results of the multiplication.

3. The angle diversity receiving device of claim 1, further comprising:
a plurality of adaptive matched filters that receives outputs of the phased array synthesizing unit;
a diversity synthesizing unit that performs angle diversity synthesis by synthesizing outputs of the adaptive matched filters; and
an automatic equalizing unit that automatically equalizes an output of the diversity synthesizing unit,
wherein the correlation control circuit outputs the correlation value on the basis of two complex tap multiplication coefficients of the adaptive matched filters, and each of the phased array synthesizing units performs phased array synthesis by multiplying the received signal of the branch by a complex coefficient based on the correlation value and adds up the results of the multiplication.

4. The angle diversity receiving device according to claim 1, wherein the plurality of antenna elements are horn antennas.

5. An angle diversity receiving method performing angle diversity reception by configuring branches of diversity in accordance with received signals of an array antenna, comprising:
  generating a received signal of a branch by performing phased array synthesis for the received signals of a plurality of antenna elements included in the array antenna;
  outputting a correlation value between two received signals of the branches; and
  controlling an angular difference in orientations of the branches for which the correlation value is calculated so that the correlation value decreases.

6. An angle diversity receiving device performing angle diversity reception by configuring branches of angle diversity in accordance with received signals of an array antenna, the angle diversity receiving device comprising:
  a plurality of phased array synthesizing means for generating a received signal of the branch by performing phased array synthesis for received signals of a plurality of antenna elements included in the array antenna; and
  correlation control means for calculating and outputting a correlation value between two received signals of the branches, wherein
  the phased array synthesizing means controls an angular difference in orientations of the branches for which the correlation value is calculated so that the correlation value decreases.

* * * * *